United States Patent
Iliadis et al.

(10) Patent No.: US 9,606,736 B2
(45) Date of Patent: Mar. 28, 2017

(54) ADAPTIVELY MOUNTING AND UNMOUNTING REMOVABLE STORAGE MEDIA BASED ON MONITORING REQUESTS AND STATES OF STORAGE DRIVES AND THE STORAGE MEDIA

(71) Applicant: International Business Machines Corporation, Armonk, NY (US)

(72) Inventors: Ilias Iliadis, Rueschlikon (CH); Jens Jelitto, Rueschlikon (CH); Yusik Kim, Eekwal (NL); Slavisa Sarafijanovic, Tobelhof (CH); Vinodh Venkatesan, Wassergass (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/791,914

(22) Filed: Jul. 6, 2015

(65) Prior Publication Data
US 2016/0103618 A1    Apr. 14, 2016

(30) Foreign Application Priority Data
Oct. 10, 2014    (GB) .................................. 1418000.4

(51) Int. Cl.
*G06F 3/06*    (2006.01)

(52) U.S. Cl.
CPC .......... *G06F 3/0611* (2013.01); *G06F 3/0604* (2013.01); *G06F 3/067* (2013.01); *G06F 3/0631* (2013.01); *G06F 3/0653* (2013.01); *G06F 3/0685* (2013.01)

(58) Field of Classification Search
CPC .... G06F 3/0604; G06F 3/0611; G06F 3/0631; G06F 3/0653; G06F 3/067; G06F 3/0685
See application file for complete search history.

(56) References Cited

U.S. PATENT DOCUMENTS

| | | | |
|---|---|---|---|
| 5,239,650 A * | 8/1993 | Hartung | G06F 3/0601 710/8 |
| 5,469,560 A | 11/1995 | Beglin | |
| 5,832,523 A | 11/1998 | Kanai et al. | |

(Continued)

OTHER PUBLICATIONS

M.A.B. et at.,"Application of Polling Systems," Department of Mathematics and Computer Science, Eindhoven University of Technology, Feb. 24, 2011, pp. 1-36.

(Continued)

*Primary Examiner* — Aracelis Ruiz
(74) *Attorney, Agent, or Firm* — Cantor Colburn LLP

(57) ABSTRACT

A storage system is proposed which comprises a data storage device including a number N of removable storage media for storing data, with N≥2, and a number m of drives, with m≥1, wherein each of the m drives is configured to drive one of the removable storage media mounted to the drive. The storage system includes a server being coupled to the data storage device and configured to serve requests from clients, and a controller which is configured to control the data storage device to adaptively unmount the removable storage media based on a monitoring information of the requests at the data storage device, states of the drives, and states of the removable storage media.

18 Claims, 4 Drawing Sheets

(56) References Cited

U.S. PATENT DOCUMENTS

| | | | |
|---|---|---|---|
| 7,308,529 B1* | 12/2007 | Desai | G11B 15/689 |
| | | | 711/111 |
| 7,757,052 B2 | 7/2010 | Bello et al. | |
| 2013/0111154 A1 | 5/2013 | Taniyama | |
| 2014/0163722 A1 | 6/2014 | Haustein et al. | |
| 2015/0160865 A1* | 6/2015 | Hasegawa | G06F 3/0611 |
| | | | 711/111 |

OTHER PUBLICATIONS

S.C.B. "A Polling System With a Dormant Server" Stichting Mathematisch Centrum, Jun. 1993, pp. 1-38.
UK Search Report; Application No. GB1418000.4; Patents Act 1977: Search Report under section 17(5); Date Mailed: Apr. 9, 2015, pp. 1-3.

* cited by examiner

ADAPTIVELY MOUNTING AND UNMOUNTING REMOVABLE STORAGE MEDIA BASED ON MONITORING REQUESTS AND STATES OF STORAGE DRIVES AND THE STORAGE MEDIA

FOREIGN PRIORITY

This application claims priority to Great Britain Patent Application No. 1418000.4, filed Oct. 10, 2014, and all the benefits accruing therefrom under 35 U.S.C. §119, the contents of which in its entirety are herein incorporated by reference.

BACKGROUND

The present invention relates to a storage system and to a method for operating such a storage system.

In a conventional storage system, a single drive, like a tape drive in a tape library, may serve multiple queues, for example multiple cartridges in a type library. Such a storage system may be a polling system. Additional applications of such a system, including computer communication systems, production systems and traffic and transportation systems are described in Marco A. A. Boon, Rob. D. van der Mei, Eric M. M. Winands, "Applications of polling systems", Surveys in Operations Research and Management Science, 2011, 16(2), pp. 67-82.

In such systems, it is important to optimize the strategy of serving the different queues in order to minimize the average waiting time and service time. Conventional approaches schedule the service requests, if multiple queues request service, e.g., round-robin, first-come-first-serve, or the like. For example, under an exhaustive service discipline, the drive continues to work until the queue it is serving becomes empty. The order in which the drive may serve the queues is determined by some routing mechanisms. Such a routing mechanism may depend on the actual state of the system or may be independent of the state of the system. The first may be a dynamic approach and the second may be a static approach. Such, upon service completion in a particular queue, the drive may proceed to serve another queue. However, if all remaining queues are empty, then, in anticipation of subsequent arrivals of requests, a decision regarding the state of the drive is required such that the storage system continues to operate in an optimal way. For instance, a drive may halt at a queue as opposed to continue visiting empty queues (see S. C. Borst, "A Polling System with a Dormant Server", Report BS-R9313, 1993). Another variant lets the drive visit queues until it reaches a specific queue that serves as its home base where it halts.

In particular, the storage system may be a tape system having many tape cartridges that have to be served with a single or a few tape drives or an optical disk archive with one or a few reader units. Both cases may be highly relevant for tiered data centers and cloud storage solutions, where vast amounts of infrequently used data have to be stored for long periods of time at minimal cost. The usage of removable cheap media and only a relatively small number of reader units or drives may be a key for low-cost storage solutions.

For example, a conventional tape system consists of a tape drive and cartridge control unit and tape drives. A library manager may be the onboard library intelligence that controls all of the operations. It enables the attachment of multiple host platforms, maintains a database of the cartridges held in the library and holds status information about library components.

The cartridge accessor (or tape robot with cartridge grippers) may identify and move cartridges between cartridge storage cells, tape drives and library input/output facilities. Multiple grippers on the cartridge accessor may be provided to handle more than one cartridge at a time and increase the performance of the tape library.

Two logically different types of connection paths may be required between a host and a type library: the data path to the tape transport (for data and tape drive commands) and the library control path to the library manager (for library-specific commands such as mount and unmount).

Read/write requests submitted to the cartridges are queued in corresponding queues and are subsequently served after the corresponding cartridges have been mounted. When the requests for a given cartridge have been served and there are no other requests pending for a disk or any other cartridge, the given cartridge typically remains mounted in anticipation of the future requests to this cartridge. This may minimize the waiting time for the new requests to be served by the same cartridge. Such a static policy, however, may not be optimal in the case where the chances of this event occurring are minimal. It may be important to note that the unmounting or mounting of a cartridge may take a significant amount of time compared to the actual data read or write operation.

As already indicated above, conventional rules for scheduling the requests in the storage system may be suboptimal for realistic tape system used scenarios. For example, if a tape system is used as an active archive tier, the less frequently used (i.e., cold) data is moved from a fast media, such as a disk storage to tapes, mainly for cost reasons. In such systems, the majority of the data is typically cold data, and the hotness of the data (and therefore of the tapes) may change over time, e.g., when users start or stop actively working on a project that involves particular data in the system.

However, the response time when accessing data from tape may be important to many users, especially from those tapes with relatively hot data, e.g., tapes that have been accessed, possibly multiple times over the previous hours or days and therefore have an increased likelihood of being accessed again in the near future).

Due to cost reasons, the number of tape drives may be typically smaller than the number of tapes or media to be served. It is therefore expected that not all tapes containing hot data can be mounted at the same time or have their data tiered to a more expensive storage tier.

In the following, the impacts of conventional tape mount/unmount rules in such a storage system are considered: Once the requests to a tape are served, the conventional solutions typically proceed as follows:

1. Always Unmount the Tape (AO):

If the tape is hot, there is a high likelihood of subsequent requests to this tape, so unmounting the tape may result in significantly increased response time for the next request to this tape, because the tape will have to be mounted again and the unmount/mount time is typically much larger than the corresponding seek time. As the majority of the requests are destined to hot tapes, this may in turn have a significant performance degradation, which is not offset by the faster response of the already unmounted type drives to new requests for other non-hot tapes.

2. Always Keep the Tape Mounted (AKM) Until a New Request Comes to Another Tape:

As mentioned above, not all hot tapes can be mounted simultaneously. Thus, requests for tapes that are not mounted will experience long delays given that tapes not needed should be first unmounted. The response time may be improved if some of the tapes were not kept mounted so that the corresponding drives are kept ready to serve the new request to other tapes.

3. If there is a Hotter Tape, Unmount the Tape and Mount the Hotter One (AUM):

This rule has the same drawbacks as the above rule 2, given that a significant portion of requests is not associated with the hottest tapes mounted. This is due to the fact that, as mentioned above, not all tapes containing hot data can be mounted at the same time because the number of hot tapes is typically larger than the number of tape drives. Therefore, these requests are to be served by tapes that are not mounted and consequently they will experience response times that involve unwind, unmount, mount and seek times, compared with the much smaller mount and seek times in the case where some of the tape drives were unmounted and ready for these requests.

Further, fixed rules based on obvious combinations of the above with the standard approaches 1-3 are also possible, such as e.g., keep tape mounted (AKM) for some fixed periods of time after serving the requests and then unmount (AU). The drawbacks discussed above, however, may still hold and affect the system performance disadvantageously.

Accordingly, it is an aspect of the present invention to provide an improved storage system.

SUMMARY

In one aspect, a storage system includes a data storage device including a number N of removable storage media configured to data, with N≥2, and a number m of drives, with m≥1, wherein each of the m drives is configured to drive one of the removable storage media mounted to the drive; a server coupled to the data storage device and configured to serve requests from clients; and a controller configured to control the data storage device to adaptively unmount the removable storage media based on monitoring information of the requests at the data storage device, states of the drives, and states of the removable storage media.

In another aspect, a method for operating a storage system including a data storage device with a number N of removable storage media, with N≥2, and a number m of drives, with m≥1, wherein each of the m drives is configured to drive one of the removable storage media mounted to the drive, and a server coupled to the data storage device and configured to serve requests from clients, including controlling the data storage device to adaptively unmount the removable storage media based on a monitoring information of the requests at the data storage device, states of the drives, and states of the removable storage media.

In another aspect, a nontransitory computer readable storage medium having computer readable instructions stored thereon that, when executed by a computer, implement a method for operating a storage system including a data storage device with a number N of removable storage media, with N≥2, and a number m of drives, with m≥1, wherein each of the m drives is configured to drive one of the removable storage media mounted to the drive, and a server coupled to the data storage device and configured to serve requests from clients, including controlling the data storage device to adaptively unmount the removable storage media based on a monitoring information of the requests at the data storage device, states of the drives, and states of the removable storage media.

BRIEF DESCRIPTION OF THE DRAWINGS

Similar or functionally similar elements in the figures have been allocated the same reference signs if not otherwise indicated.

DETAILED DESCRIPTION

Figure 1:
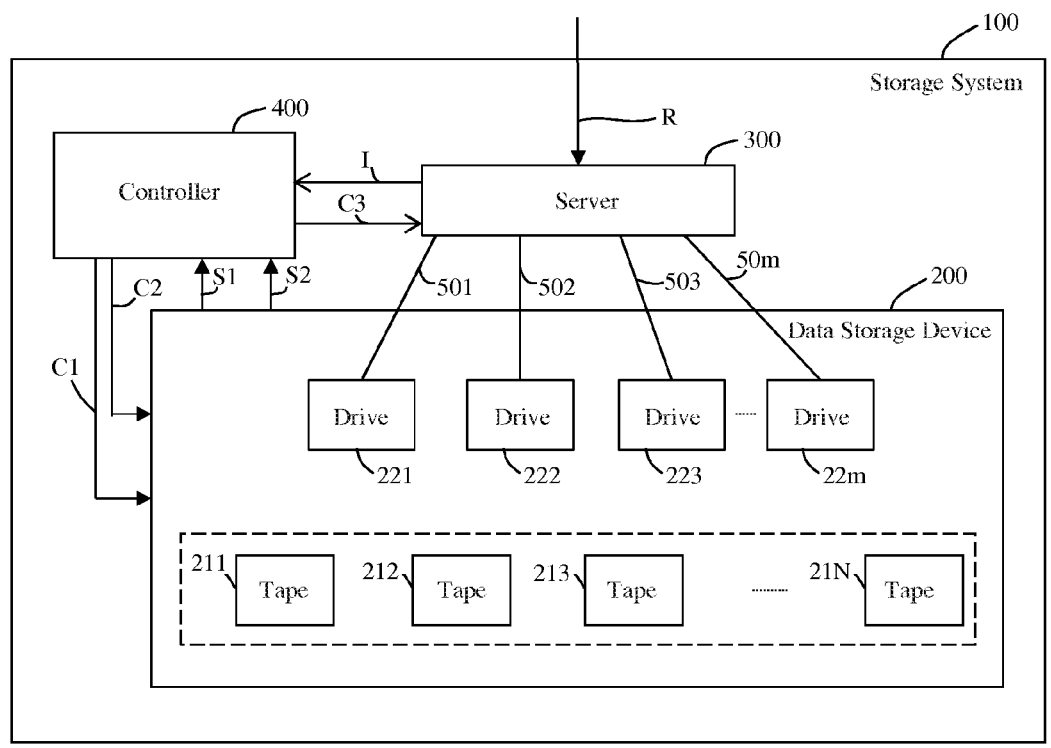
FIG. 1 shows a schematic block diagram of a first embodiment of a storage system.

According to a first aspect, a storage system is proposed which comprises a data storage device including a number N of removable storage media for storing data, with N≥2, and a number m of drives, with m≥1, wherein each of the m drives is configured to drive one of the removable storage media mounted to the drive. The storage system includes a server coupled to the data storage device and configured to serve requests from clients, and a controller which is configured to control the data storage device to adaptively unmount the removable storage media based on a monitoring information of the requests at the data storage device, states of the m drives, and states of the N removable storage media.

In an embodiment, the monitoring information includes an arrival rate of the requests at the storage system, a total size of the requests received at the storage system for a certain time period and/or an average size of the requests received at the stored system for the certain time period. The monitoring information may be also called traffic characteristics. The arrival rate of requests at the storage system may correspond to a number of read/write requests arriving to the storage system per time unit. Further, the monitoring information may also include the arrival rates of requests to the removable storage media which may correspond to the number of read/write requests arriving at the various removable storage media per time unit.

In a further embodiment, the controller is configured to control the data storage device to adaptively unmount the removable storage media based on the monitoring information, the mount states of the removable storage media, the number N of the removable storage media, the number m of the drives, the states of the m drives, an arrival rate distribution of the N removable storage media, and at least one drive performance characteristic.

In this embodiment, the adaptive control scheme that the controller uses for adaptively unmounting the removable storage media may be improved, because the number of factors or parameters for determining or triggering unmount events is increased. Further, parameters or characteristics describing the traffic and/or the performance of the data storage device may be used for the present adaptive control scheme.

In a further embodiment, the at least one drive performance characteristic includes a mount time, an unmount time, a seek time and/or a bandwidth parameter.

In particular, the mount time is the time required to mount an unmounted removable storage medium. In particular, the unmount time is a time required to unmount a mounted removable storage medium. Further, the seek time is a time which is required to position a mounted removable storage medium to start serving a read/write request. Moreover, the bandwidth parameter (also called bandwidth) describes the maximum amount of data that can be transferred by a drive per time unit.

In a further embodiment, for a single drive, with m=1, the controller is configured to control the data storage device to unmount a certain removable storage medium upon service completion, if no request is pending for the certain removal storage medium and the following expression is satisfied:

$$N>(M+U)\cdot\lambda/[1-\exp(-\lambda\cdot U)],$$

wherein N designates the number of removable storage media, wherein M designates a mount time for mounting the removable storage medium at the drive, wherein U designates an unmount time for unmounting the removable storage media from the drive, and wherein λ designates a symmetric arrival rate at each of the N removable storage media.

In a further embodiment, for a plurality of drives, with m>1, the controller is configured to control the data storage device to unmount a certain removable storage medium upon service completion, if there are no removable storage media waiting to be served, there are less than K unmounted drives in the storage system, with K>0, and the following expression is satisfied:

$$N>(M+U)\cdot\lambda/\{m\cdot[1-\exp(-\lambda\cdot U/m)]\},$$

wherein N designates the number of removable storage media, wherein M designates a mount time for mounting the removable storage medium at the drive, wherein U designates an unmount time for unmounting the removable storage media from the drive, wherein λ designates a symmetric arrival rate at each of the N removable storage media, and wherein m designates the number of drives.

In a further embodiment, for a plurality of drives, with m>1, and arbitrary arrival rates $\lambda_i$ at the N removable storage media, with i∈[1, . . . , N], the controller is configured to control the data storage device to unmount the k-th removable storage medium upon service completion, if the following expression is satisfied:

$$(U+M)\cdot\lambda_k<R_j+(U+M)\cdot\lambda'_j, \text{ with } j\in[1+K, \ldots, J],$$

wherein M designates a mount time for mounting the removable storage medium at the drive, wherein U designates an unmount time for unmounting the removable storage media from the drive, wherein $\lambda_k$ designates an arrival rate at the k-th removable storage medium, wherein J designates the number of unmounted removable storage media of the N removable storage media, wherein K designates the number of unmounted drives of the m drives, wherein $R_j$ designates a current number of requests queued to the j-th removable storage medium, and wherein $\lambda'_j$ designates an arrival rate of to the j-th removable storage medium based on an indexing according to decreasingly ordered numbers of the accumulated requests.

In particular, $R_1+\lambda'_1\cdot(M+U)>R_1+\lambda'_2\cdot(M+U)>\ldots>R_j+\lambda'_j\cdot(M+U)$ are expected accumulated numbers of requests to the j-th unmounted removable storage medium at a time delayed by (U+M), indexed according to decreasingly ordered numbers of accumulated requests.

In a further embodiment, the controller is configured to control the data storage device to adaptively unmount and to adaptively mount the removable storage media based on the monitoring information of the requests at the data storage device and the mount states of the removable storage media.

In this embodiment, the adaptive control scheme includes adaptively unmounting and adaptively mounting the storage media, both based on the monitoring information, the states of the storage device and the storage media.

In a further embodiment, the storage system comprises a plurality of data storage devices, wherein each of the plurality of data storage devices has many removable storage media. The server may be connected to or embodied in at least one storage node which is connected to the data storage devices.

In particular, the data storage devices are different data storage devices. By means of the present adaptive control scheme, the plurality of data storage devices may be controlled, in particular using a storage node.

In a further embodiment, the controller is configured to control the data storage device to adaptively unmount the removable storage media such that a certain data access performance metric is optimized.

In a further embodiment, the controller is configured to control the data storage device to adaptively unmount and to adaptively mount the removable storage media such that the certain performance metric is optimized.

In a further embodiment, the certain data access performance metric includes a mean response time and/or a mean waiting time of the requests of the clients for accessing data.

The controller may be a controlling entity. Moreover, the server may be a serving entity. The respective entity, e.g., the controller or the server, may be implemented in hardware and/or in software. If the entity is implemented in hardware, it may be embodied as a device, e.g., as a computer or as a processor or as a part of a system, e.g., a computer system. If the entity is implemented in software it may be embodied as a computer program product, as a function, as a routine, as a program code or as an executable object.

Any embodiment of the first aspect may be combined with any embodiment of the first aspect to obtain another embodiment of the first aspect.

According to a second aspect, a method for operating a storage system including a data storage device with a number N of removable storage media, with N≥2, and a number m of drives, with m≥1, wherein each of the m drives is configured to drive one of the removable storage media mounted to the drive, and a server being coupled to the data storage device and configured to serve requests from clients is proposed. The method includes controlling the data storage device to adaptively unmount the removable storage media based on monitoring information of the requests at the data storage device, states of the drives, and states of the removable storage media.

According to a third aspect, the invention relates to a computer program comprising a program code for executing the method of the second aspect for operating a storage system when run on at least one computer.

According to a fourth aspect, a storage arrangement is suggested, wherein the storage arrangement includes a number of storage devices of the above-mentioned first aspect. The storage arrangement may be a tiered data center or a cloud storage arrangement.

In the following, exemplary embodiments of the present invention are described with reference to the enclosed figures.

In FIG. 1, a schematic block diagram of a first embodiment of a storage system 100 is depicted. The storage system 100 comprises a data storage device 200. The data storage device 200 includes a number N of removable storage media 211-21N for storing data, with N≥2. Further, the data storage device 200 includes a number m of drives 221-22m, with m≥1. Each of the m drives 221-22m is configured to drive one of the removable storage media 211-21N. For example, the storage system 100 is a tape storage system or an optical disc storage system. Further, the data storage device 200 may be a type library or an optical disk archive. Furthermore, the drive 221-22m may be a tape drive, an optical disk drive or a reader unit. The removable storage media 211-21N may be a tape, tape cartridge or an optical disk.

Moreover, the data storage device 200 comprises a server 300. The server 300 is coupled to the data storage device 200. In particular, the server 300 is connected to the data storage device 200 by a number of drive throughputs 501-50m. In particular, the drive throughputs 501-50m are direct drive throughputs. The server 300 is configured to serve requests R from clients. In particular, the requests R are data requests including write requests and read requests to the storage media 211-21N.

Furthermore, the storage system 100 comprises a controller 400. The controller 400 may be a scheduler or may be part of a scheduler. The controller 400 is configured to control the data storage device 200 to adaptively unmount the removable storage media 211-21N using an unmount control signal C1 based on monitoring information I of the requests R at the data storage device 200, states S1 of the m drives 221-22m and states S2 of the removable storage media 211-21N.

Figure 2:
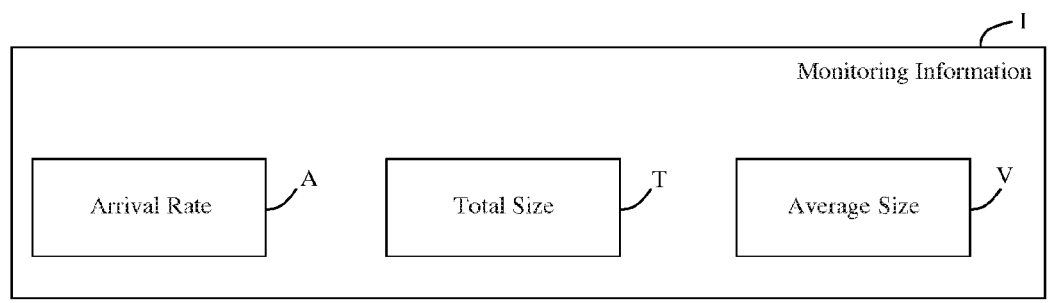
FIG. 2 shows a schematic block diagram of an embodiment of the monitoring information.

In particular, the controller 400 is configured to control the data storage device 200 to adaptively unmount (using an unmount control signal C1) and to adaptively mount (using a mount control signal C2) the removable storage media 211-21N based on the monitoring information I of the requests R, the states S1 of the m drives 221-22m and the states S2 of the removable storage media 211-21N. An example for the monitoring information I is shown in FIG. 2. With respect to FIG. 2, the monitoring information I may include an arrival rate A of the requests R at the storage system 100, a total size T of the requests R received at the storage system 100 for a certain time period and an average size V of the requests R received at the storage system 100 for the certain time period.

Further, the controller 400 may control the scheduling of the server 300 by a server control signal C3.

Particularly, the controller 400 may be configured to control the data storage device 200 to adaptively unmount the removable storage media 211-21N such that a certain data access performance metric is optimized. The certain data access performance metric may include a mean response time and a mean waiting time of the requests R of the clients for accessing data at the storage system 100.

Additionally, the controller 400 may be configured to control the data storage device 200 to adaptively unmount and to adaptively mount the removable storage media 211-21N such that the certain performance metric is optimized.

In the following, some examples are given for an unmount scheme, the controller 400 may use to generate or to trigger the unmount control signal C1:

FIRST EXAMPLE

The first example is an example for a single drive, with m=1. In this first example, N designates the number of removable storage media 211-21N, M designates a mount time for mounting the removable storage medium 211-21N at the drive 221-22m, U designates an unmount time for unmounting the removable storage media 211-21N from the drive 221-22m, and λ designates a symmetric arrival rate at each of the N removable storage media 211-21N.

In this first example, the controller 400 controls the data storage device 200 to unmount (controlled by the unmount control signal C1) a certain removable storage medium 211 upon service completion, if no request R is pending for the certain removable storage medium 211 and the following expression is satisfied:

$$N > (M+U) \cdot \lambda / [1 - \exp(-\lambda \cdot U)]$$

SECOND EXAMPLE

In the following second example, it is assumed that a plurality of drives 221-22m are used, with m>1. In this second example, N designates the number of removable storage media 211-21N, M designates the mount time, U designates the unmount time, λ designates the symmetric arrival rate at each of the N removable storage media 211-21N and m designates the number of drives 221-22m used.

In the second example, the controller 400 controls the data storage device 200 to unmount (by the unmount control signal C1) a certain removable storage medium 211-21N upon service completion, if there are no removable storage media 211-21N waiting to be served, there are less than K unmounted drives 221-22m in the storage system 100, with K>0, and the following expression is satisfied:

$$N > (M+U) \cdot \lambda / \{m \cdot [1 - \exp(-\lambda \cdot U/m)]\}$$

THIRD EXAMPLE

In the third example, a plurality of drives 221-22m are used, with m>1, and arbitrary arrival rates $\lambda_i$ at the N removable storage media 211-21N, with i∈[1, . . . , N], are assumed.

In this third example, M designates the mount time, U designates the unmount time, $\lambda_k$ designates the arrival rate at the k-th removable storage medium 211-21N, J designates the number of unmounted removable storage media of the N removable storage media 211-21N, K designates the number of unmounted drives of the m drives 221-22m, $R_j$ designates a current number of requests queued at the j-th removable storage medium 211-21N, and $\lambda'_j$ designates an arrival rate of requests R to the j-th removable storage medium 211-21N based on an indexing according to decreasingly ordered expected numbers of the accumulated requests R to the unmounted removable storage media at time delayed by (U+M):

$$R_1 + \lambda'_1 \cdot (U+M) \geq R_2 + \lambda'_2 \cdot (U+M) \geq \ldots \geq R_J + \lambda'_J (U+M)$$

In this third example, the controller 400 controls the data storage device 200 to unmount the k-th removable storage medium 211 upon service completion, if the following expression is satisfied:

$$(U+M) \cdot \lambda_k < R_j + (U+M) \cdot \lambda'_j, \text{ with } j \in [1+K, \ldots, J]$$

FOURTH EXAMPLE

In the fourth example, one drive or a plurality of drives 221-22m is used, with m≥1, and arbitrary arrival rates λi at the N removable storage media 211-21N, with i∈[1, . . . , N], are assumed. In this fourth example, M designates the mount time, U designates the unmount time, $\lambda_k$ designates the arrival at the k-th removable storage medium 211-21N, J designates the number of unmounted removable storage media 211-21N, and K designates the number of unmounted drives of the m drives 221-22m.

In this fourth example, the controller 400 controls the data storage device 200 to unmount the k-th removable storage medium 211-21N upon service completion, if the following expression is satisfied:

$$(U+M)\cdot\lambda_k < [1-\exp(-\lambda'\cdot U)]$$

where $\lambda'=\text{Sum}(\lambda_j)$, $j\in[1+K, \ldots, J]$.

Here, $\lambda'_1 > \lambda'_2 > \ldots > \lambda'_J$ are the arrival rates of the J unmounted storage media indexed for decreasingly ordered arrival rate values.

According to some implementations, the controller 400 may be a scheduler or may be part of a scheduler. The scheduler 400 may be configured to schedule requests received at the storage system 100 to different queues associated to the different drives 221-22m. According to some implementations, the storage system 100 is a tape storage system or an optical disk storage system, the data storage device 200-202 is a device library or an optical disk archive, the drive 221-22m is a tape drive, an optical disk drive or a reader unit, the removable storage medium 211-21N is a tape (a tape cartridge) or an optical disk, and the server is a node in a network. For example, the node is a LTFS (Linear Tape File System) node or a LTFS server.

In particular, the states of the removable storage media 211-21N are: unmounted, mounting, mounted busy serving requests, mounted not busy and unmounting. Further, the states of the drives 221-22m may be: unmounted, mounting, mounted, busy serving requests, mounted not busy and unmounting.

In particular, the present storage system 100 is adaptive. If characteristics of the storage system 100, like the monitoring information of the requests, the states of the drives 221-22m and/or the states of the storage media 200-202, change, the controller 400 may control unmounting the storage media 211-21N adaptively.

In the following, the process of adaptively unmounting and the process of adaptively unmounting and adaptively mounting may be called adaptive control scheme. According to the present adaptive control scheme, when all requests for a given storage medium 211-21N, like a cartridge, have been served in the storage system 100, and there are no other requests pending for another storage medium 211-21N, the given storage medium 211-21N may remain mounted or an unmount process may be initiated depending on the various characteristics (or factors) mentioned above.

Further, the present adaptive control scheme may consider several optimization objectives, for example, minimizing mean response times or mean waiting times. If, for example, the arrival rate of requests to a corresponding queue of the storage system 100 is small compared to the arrival rate to the remaining queues of the storage system 100, then an unmount process is initiated by the present adaptive control scheme, which may reduce the waiting time of a potential arrival to one of the other queues.

In sum, the proposed adaptive control scheme (which may be also called adaptive scheduling scheme) may exhibit the following advantages: The mean waiting time of the storage system 100 can be significantly reduced. The present adaptive control scheme may be optimized in the light of predefined objectives. The present adaptive control scheme provides sufficient flexibility of optimizing the storage system performance in time-varying environments.

In particular, the controller 400 controls by means of the present adaptive control scheme the number of drives 221-22m that are kept unmounted and those that are kept mounted to take advantage of both having the hottest storage media 211-21N mounted and some drives 221-22m unmounted and ready for serving new requests to other relatively hot storage media 211-21N. As a result, the total system response time may be improved significantly. This significantly decreases the percentage of the requests to the storage media 211-21N that experience significantly longer response times.

Furthermore, using the proposed adaptive control scheme may result in reducing the number of drives without sacrificing performance.

In particular, the present adaptive control scheme may have a very high impact in storage systems 100 that use data collocation. In the case where collocation is tape-pool-based, the present adaptive control scheme may determine hotness of individual tapes based not only on the past and current requests to the tape, but also on the requests to other tapes from the same pool.

A practical example of data with changing hotness is that of data that are gathered by astronomical observations and are accessed and processed by many researchers worldwide. There is trendy data and non-trendy data, in other words, for any piece of data there is a hot streak and a cold streak depending on the most recent observation results. Depending on recent discoveries by scientists processing the data, this trend may change very abruptly. In such scenarios, the present controller (or scheduler) may quickly adapt to this dynamically changing environment, and therefore is adapted to significantly improve the performance compared to a conventional system that employs a static policy.

Figure 3:
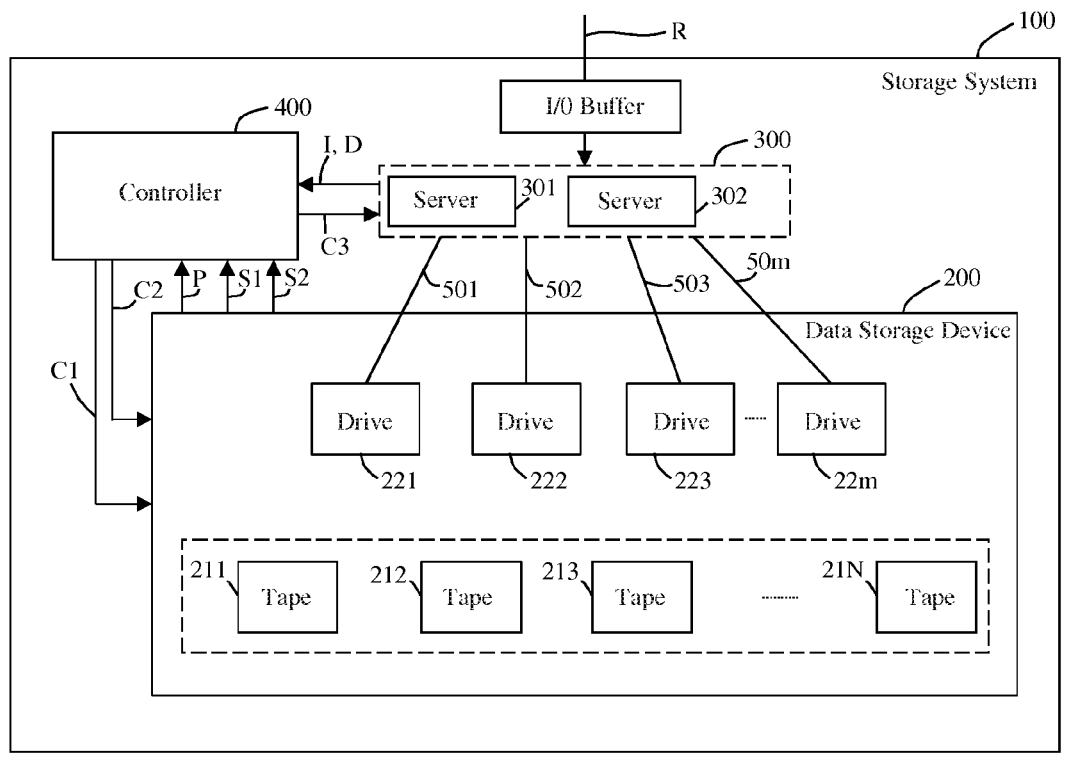
FIG. 3 shows a schematic block diagram of a second embodiment of a storage system.

In FIG. 3, a schematic block diagram of a second embodiment of a storage system 100 is depicted. The second embodiment of the storage system 100 of FIG. 3 is based on the first embodiment of FIG. 1. The second embodiment of the storage system of FIG. 3 differs from the first embodiment of FIG. 1 therein that in that the storage system 100 of FIG. 3 includes a server arrangement 300 including a plurality of servers 301, 302. Without loss of generality, the plurality of servers 301, 302 is two in FIG. 3. Further, the servers 301, 302 provide additional information regarding the received requests R to the controller 400. For buffering the requests R received at the storage system 100, the storage system 100 further includes an I/O buffer 600 coupled to the server arrangements 300.

Regarding the additional information, the servers 301, 302 provide the following information to the controller 400: the monitoring information I (see FIG. 2) and an arrival rate distribution D of the N removable storage media 211-21N.

Figure 4:
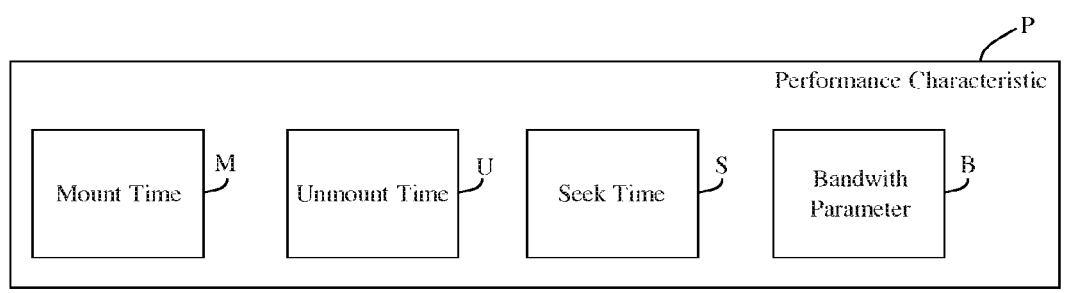
FIG. 4 shows a schematic block diagram of an embodiment of the drive performance characteristic.

Further, the data storage device 200 provides at least one drive performance parameter P to the controller 400. In this regard, FIG. 4 shows an example for the drive performance characteristic P. With respect to FIG. 4, the drive performance characteristic P includes a mount time M, an unmount time U, a seek time S and a bandwidth parameter B.

Figure 5:
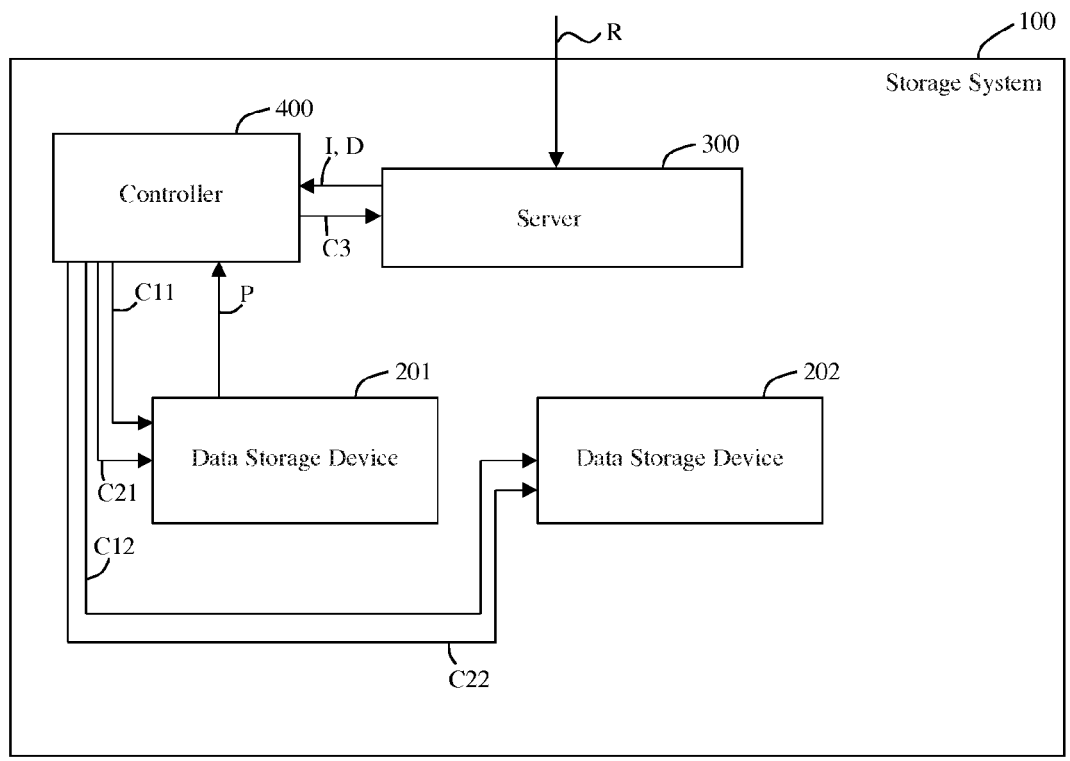
FIG. 5 shows a schematic block diagram of a third embodiment of a storage system.

FIG. 5 shows a schematic block diagram for a third embodiment of a storage system 100. The third embodiment of the storage system 100 of FIG. 5 is based on the first embodiment of the storage system 100 of FIG. 1. FIG. 5 illustrates that the storage system 100 may include a plurality of data storage devices 201, 202. Without loss of generality, FIG. 5 shows two data storage devices 201, 202. Each of the data storage devices 201, 202 may be embodied as the data storage device 200 of FIG. 1. The server 300 is coupled to each of the data storage devices 201, 202 by means of a respective plurality of drive throughputs 505, 506. Further, the controller 400 uses an unmount control signal C11 for the data storage device 201, a mount control signal C21 for the data storage device 201, an unmount control signal C12 for the data storage device 202 and a mount control signal C22 for the data storage device 200.

Figure 6:
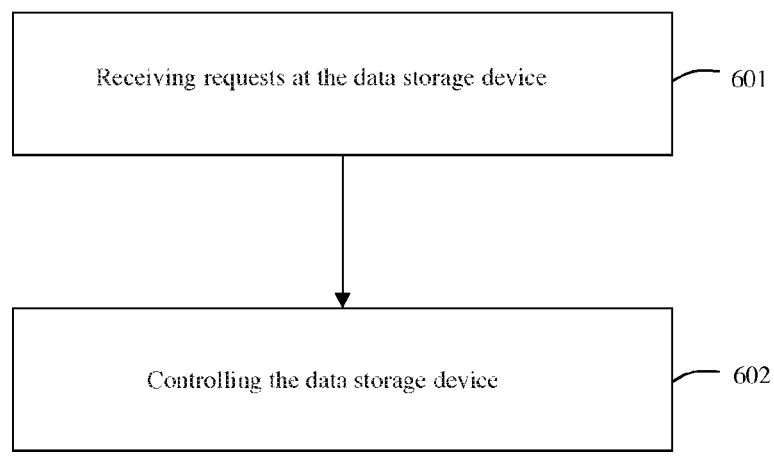
FIG. 6 shows an embodiment of a sequence of method operations for operating a storage system.

FIG. 6 depicts an embodiment of a sequence of method operations for operating a storage system 100 including a data storage device 200. Examples for such a storage system 100 are shown in FIGS. 1 and 3.

The storage system 100 has a data storage device 200 with a number N of removable storage media 211-21N, and a number m of drives 221-22m, wherein each of the drives 221-22m is configured to drive one of the removable storage media 211-21N mounted to the drive 221-22m. Further, the storage system 100 has a server 300 which is coupled to the data storage device 200 and is configured to serve requests R from clients. The method of FIG. 6 has the following operations 601 and 602:

In operation 601, requests R from clients for accessing the data storage 200 are received.

In operation 602, the data storage device 200 is controlled to adaptively unmount the removable storage media 211-21N based on monitoring information I of the received requests R, states S1 of the drives 221-22m, and states S2 of the removable storage media 211-21N.

Computerized devices may be suitably designed for implementing embodiments of the present invention as described herein. In that respect, it may be appreciated that the methods described herein are largely non-interactive and automated. In exemplary embodiments, the methods described herein may be implemented either in an interactive, partly-interactive or non-interactive system. The methods described herein may be implemented in software (e.g., firmware), hardware, or a combination thereof. In exemplary embodiments, the methods described herein are implemented in software, as an executable program, the latter executed by suitable digital processing devices. In further exemplary embodiments, at least one operation or all operations of above method of FIG. 6 may be implemented in software, as an executable program, the latter executed by suitable digital processing devices. More generally, embodiments of the present invention may be implemented wherein general-purpose digital computers, such as personal computers, workstations, etc., are used.

Figure 7:
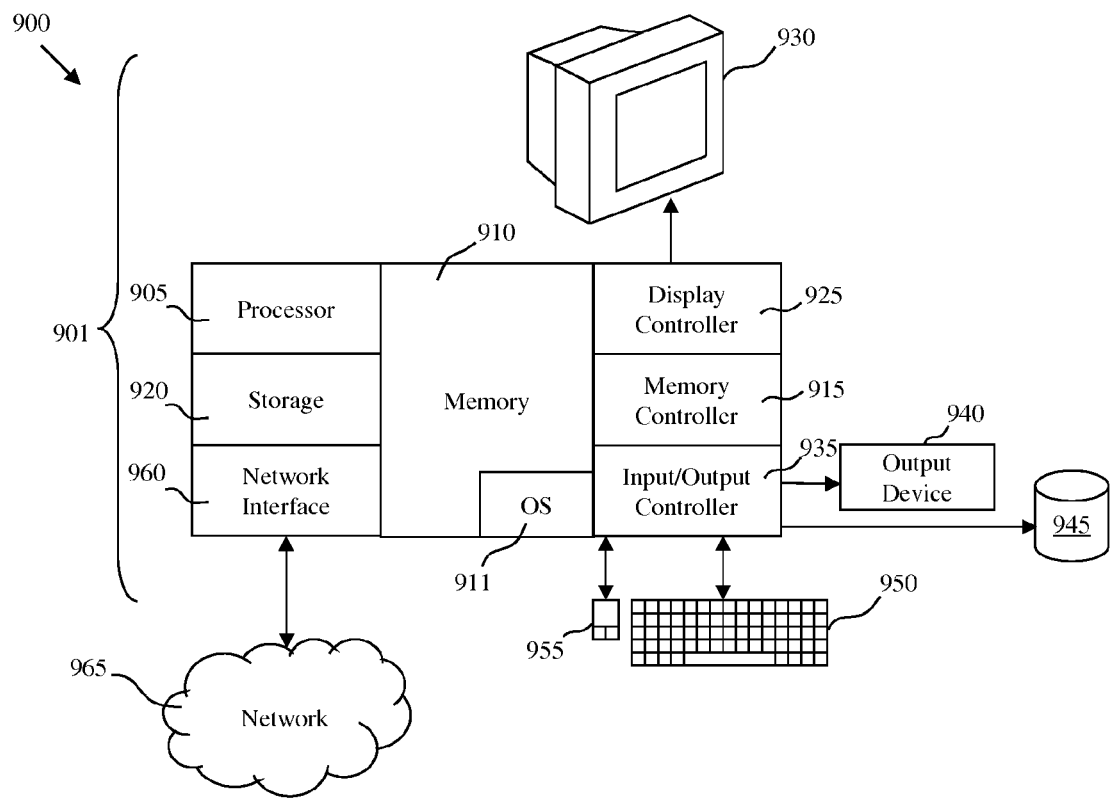
FIG. 7 shows a schematic block diagram of an embodiment of a system adapted for performing the method for operating a storage system.

For instance, the system 900 depicted in FIG. 7 schematically represents a computerized unit 901, e.g., a general-purpose computer. In exemplary embodiments, in terms of hardware architecture, as shown in FIG. 7, the unit 901 includes a processor 905, memory 910 coupled to a memory controller 915, and one or more input and/or output (I/O) devices 940, 945, 950, 955 (or peripherals) that are communicatively coupled via a local input/output controller 935. Further, the input/output controller 935 may be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 may be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 may include any one or combination of volatile memory elements (e.g., random access memory) and nonvolatile memory elements. Moreover, the memory 910 may incorporate electronic, magnetic, optical, and/or other types of storage media. Note that the memory 910 may have a distributed architecture, where various components are situated remote from one another, but may be accessed by the processor 905.

The software in memory 910 may include one or more separate programs, each of which comprises an ordered listing of executable instructions for implementing logical functions. In the example of FIG. 7, the software in the memory 910 includes methods described herein in accordance with exemplary embodiments and a suitable operating system (OS) 911. The OS 911 essentially controls the execution of other computer programs, such as the methods as described herein (e.g., FIG. 6), and provides scheduling, input-output control, file and data management, memory management, and communication control and related services. For example, the interface 1 may be embodied in the OS 911.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods may be written as an object oriented programming language, which has classes of data and methods, or a procedure programming language, which has routines, subroutines, and/or functions.

Possibly, a conventional keyboard 950 and mouse 955 may be coupled to the input/output controller 935. Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous and operate unattended.

In addition, the I/O devices 940-955 may further include devices that communicate both inputs and outputs. The system 900 may further include a display controller 925 coupled to a display 930. In exemplary embodiments, the system 900 may further include a network interface or transceiver 960 for coupling to a network 965.

The network 965 transmits and receives data between the unit 901 and external systems. The network 965 is possibly implemented in a wireless fashion, e.g., using wireless protocols and technologies, such as WiFi, WiMax, etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 may also be an IP-based network for communication between the unit 901 and any external server, client and the like via a broadband connection. In exemplary embodiments, network 965 may be a managed IP network administered by a service provider. Besides, the network 965 may be a packet-switched network such as a LAN, WAN, Internet network, etc.

If the unit 901 is a PC, workstation, intelligent device or the like, the software in the memory 910 may further include a basic input output system (BIOS). The BIOS is stored in ROM so that the BIOS may be executed when the computer 901 is activated.

When the unit 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the methods described herein (e.g., with reference to FIG. 6 are implemented in software, the methods may be stored on any computer readable medium, such as storage 920, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 901, partly thereon, partly on a unit 901 and another unit 901, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams may be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCE NUMERALS 100 storage system
200-202 data storage device 211-21N storage medium
221-22m drive
300-302 server
400 controller
501-504 drive throughput
505, 506 plurality of drive throughputs
601, 602 method operation
A arrival rate
B bandwidth parameter
C1 unmount control signal
C2 mount control signal
C3 server control signal
I monitoring information
M mount time
P drive performance characteristic
R request
S seek time
S1 states of the drives
S2 states of the storage media
T total size
U unmount time
V average size

The invention claimed is:

1. A storage system, comprising:
a data storage device including a number N of removable storage media configured to data, with N≥2, and a number m of drives, with m≥1, wherein each of the m drives is configured to drive one of the removable storage media mounted to the drive;
a server coupled to the data storage device and configured to serve requests from clients; and
a controller configured to control the data storage device to adaptively unmount the removable storage media based on monitoring information of the requests at the data storage device, states of the drives, and states of the removable storage media,
wherein, for a single drive, with m=1, the controller is configured to control the data storage device to unmount a certain removable storage medium upon service completion, if no request is pending for the certain removable storage medium and the following expression is satisfied:

$$N > (M+U) \cdot \lambda \cdot [1 - \exp(-\lambda \cdot U)];$$

wherein N designates the number of removable storage media, wherein M designates a mount time for mounting the removable storage medium at the drive, wherein U designates an unmount time for unmounting the removable storage media from the drive, and wherein λ designates a symmetric arrival rate at each of the N removable storage media.

2. The storage system of claim 1, wherein the monitoring information includes an arrival rate of the requests at the storage system, a total size of the requests received at the storage system for one or more of a certain time period and an average size of the requests received at the storage system for the certain time period.

3. The storage system of claim 1, wherein the controller is configured to control the data storage device to adaptively unmount the removable storage media based on the monitoring information, the states of the removable storage media, the number N of the removable storage media, the states of the m drives, an arrival rate distribution of the N removable storage media, and at least one drive performance characteristic.

4. The storage system of claim 3, wherein the at least one drive performance characteristic includes a mount time, an unmount time, a seek time and/or a bandwidth parameter.

5. The storage system of claim 1, wherein, for a plurality of drives, with m>1, the controller is configured to control the data storage device to unmount a certain removable storage medium upon service completion, if there are no removable storage media waiting to be served, there are less than K unmounted drives in the storage system, with K>0, and the following expression is satisfied:

$$N > (M+U) \cdot \lambda \cdot \{m \cdot [1 - \exp(-\lambda \cdot U/m)]\};$$

wherein N designates the number of removable storage media, wherein M designates a mount time for mounting the removable storage medium at the drive, wherein U designates an unmount time for unmounting the removable storage media from the drive, wherein λ designates a symmetric arrival rate at each of the N removable storage media, and wherein m designates the number of drives.

6. The storage system of claim 1, wherein, for a plurality of drives, with m>1, and arbitrary arrival rates $\lambda_i$ at the N removable storage media, with i∈[1, ..., N], the controller is configured to control the data storage device to unmount the k-th removable storage medium upon service completion, if the following expression is satisfied:

$$(U+M) \cdot \lambda_k < R_j + (U+M) \cdot \lambda'_j, \text{ with } j \in [1+K, \ldots, J];$$

wherein M designates a mount time for mounting the removable storage medium at the drive, wherein U designates an unmount time for unmounting the removable storage media from the drive, wherein $\lambda_k$ designates an arrival rate at the j-th removable storage medium, wherein J designates the number of unmounted removable storage media of the N removable storage media, wherein K designates the number of unmounted drives of the m drives, wherein $R_j$ designates a current number of requests queued to the j-th removable storage medium, and wherein $\lambda'_j$ designates an arrival rate of to the j-th removable storage medium based on an indexing according to decreasingly ordered expected numbers of the accumulated requests to the unmounted removable storage media at time delayed by:

$$R_1 + \lambda'_1 \cdot (U+M) \geq R_2 + \lambda'_2 \cdot (U+M) \geq \ldots \geq R_j + \lambda'_j \cdot (U+M).$$

7. The storage system of claim 1, wherein the controller is configured to control the data storage device to adaptively unmount and to adaptively mount the removable storage media based on the monitoring information of the requests at the data storage device, the states of the m drives and the states of the removable storage media.

8. The storage system of claim 1, further comprising a plurality of data storage devices, wherein each of the plurality of data storage devices has a number of removable storage media, wherein the server is connected to or embodied in at least one storage node which is connected to the data storage devices.

9. The storage system of claim 1, wherein the controller is configured to control the data storage device to adaptively unmount the removable storage media such that a certain data access performance metric is optimized.

10. The storage system of claim 9, wherein the certain data access performance metric includes a mean response time and/or a mean waiting time of the requests of the clients for accessing data.

11. The storage system of claim 1, wherein the controller is configured to control the data storage device to adaptively unmount and to adaptively mount the removable storage media such that the certain performance metric is optimized.

12. The storage system of claim 1, wherein:
the storage system is one of a tape storage system and an optical disk storage system;
the data storage device is one of a tape library and an optical disk archive;
the drive is one of a tape drive, an optical disk drive and a reader unit;
the removable storage medium is one of a tape cartridge and an optical disk; and
the server is a node in a network.

13. A method for operating a storage system including a data storage device with a number N of removable storage media, with N≥2, and a number m of drives, with m≥1, wherein each of the m drives is configured to drive one of the removable storage media mounted to the drive, and a server coupled to the data storage device and configured to serve requests from clients, the method comprising:
controlling the data storage device to adaptively unmount the removable storage media based on a monitoring information of the requests at the data storage device, states of the drives, and states of the removable storage media,
wherein, for a single drive, with m=1, a controller is configured to control the data storage device to unmount a certain removable storage medium upon service completion, if no request is pending for the certain removable storage medium and the following expression is satisfied:

$N > (M+U) \cdot \lambda / [1-\exp(-\lambda \cdot U)]$;

wherein N designates the number of removable storage media, wherein M designates a mount time for mounting the removable storage medium at the drive, wherein U designates an unmount time for unmounting the removable storage media from the drive, and wherein λ designates a symmetric arrival rate at each of the N removable storage media.

14. The method of claim 13, wherein the monitoring information includes an arrival rate of the requests at the storage system, a total size of the requests received at the storage system for one or more of a certain time period and an average size of the requests received at the storage system for the certain time period.

15. The method of claim 13, wherein the controller is configured to control the data storage device to adaptively unmount the removable storage media based on the monitoring information, the states of the removable storage media, the number N of the removable storage media, the states of the m drives, an arrival rate distribution of the N removable storage media, and at least one drive performance characteristic.

16. The method of claim 15, wherein the at least one drive performance characteristic includes a mount time, an unmount time, a seek time and/or a bandwidth parameter.

17. The method of claim 13, wherein, for a plurality of drives, with m>1, the controller is configured to control the data storage device to unmount a certain removable storage medium upon service completion, if there are no removable storage media waiting to be served, there are less than K unmounted drives in the storage system, with K>0, and the following expression is satisfied:

$N > (M+U) \cdot \lambda / \{m \cdot [1-\exp(-\lambda \cdot U/m)]\}$;

wherein N designates the number of removable storage media, wherein M designates a mount time for mounting the removable storage medium at the drive, wherein U designates an unmount time for unmounting the removable storage media from the drive, wherein λ designates a symmetric arrival rate at each of the N removable storage media, and wherein m designates the number of drives.

18. A nontransitory computer readable storage medium having computer readable instructions stored thereon that, when executed by a computer, implement a method for operating a storage system including a data storage device with a number N of removable storage media, with N≥2, and a number m of drives, with m≥1, wherein each of the m drives is configured to drive one of the removable storage media mounted to the drive, and a server coupled to the data storage device and configured to serve requests from clients, the method comprising:
controlling the data storage device to adaptively unmount the removable storage media based on a monitoring information of the requests at the data storage device, states of the drives, and states of the removable storage media,
wherein, for a single drive, with m=1, a controller is configured to control the data storage device to unmount a certain removable storage medium upon service completion, if no request is pending for the certain removable storage medium and the following expression is satisfied:

$N > (M+U) \cdot \lambda / [1-\exp(-\lambda \cdot U)]$;

wherein N designates the number of removable storage media, wherein M designates a mount time for mounting the removable storage medium at the drive, wherein U designates an unmount time for unmounting the removable storage media from the drive, and wherein λ designates a symmetric arrival rate at each of the N removable storage media.

* * * * *